Patented Mar. 24, 1925.

1,530,987

UNITED STATES PATENT OFFICE.

HENRY DREYFUS, OF LONDON, ENGLAND.

PLASTICS CONTAINING CELLULOSE ACETATE.

No Drawing. Original application filed August 5, 1920, Serial No. 401,380. Patent No. 1,501,206, dated July 15, 1924. Divided and this application filed March 13, 1923. Serial No. 624,806.

*To all whom it may concern:*

Be it known that I, HENRY DREYFUS, a citizen of the Swiss Republic, residing at London, England, have invented certain new and useful Improvements in Plastics Containing Cellulose Acetate, of which the following is a specification.

This invention relates to the manufacture of solutions, celluloid-like masses, films, dopes, artificial silk or other compositions, preparations or articles (hereinafter included in the term "compositions of matter") having a basis of cellulose acetate, and is characterized by the employment or application of certain new or improved high-boiling solvents or plasticizing agents in and for such solutions, compositions, preparations or products hereinafter and in the claiming clauses included in the term "composition of matter".

In addition to the volatile solvents or diluents, such for instance as acetone, alcohol-benzene mixtures, methyl acetate and so forth, which are generally used in making solutions or other products such as referred to, or in some cases even without such volatile solvents or diluents, it is necessary to employ solvents or plasticizing agents of higher boiling points.

These latter play an important part, and have to fulfil numerous requirements for use in the art. Besides having a high boiling point they must be liquids or jellies at ordinary temperature or even when cooled down to low temperature, this latter being especially the case for uses where the solutions, compositions or preparations are exposed to low temperatures in service, as in the case of aircraft dopes, outdoor coatings and so forth. Also the high boiling solvents must be insoluble or very little soluble in water.

In the specification of a previous U. S. Patent No. 1,353,384 filed 15th April, 1919, I have described the employment as high boiling plasticizing solvents for cellulose acetate, of high boiling mixtures of isomeric xylene low-carbon-alkyl sulphonamides, which mixtures are liquid at ordinary temperature, and are such as can be obtained by treating an ordinary commercial xylene containing o, m and p-xylenes, by the ordinary methods of conversion into the alkyl sulphonamides, for example by treating the crude xylene with chlorosulphonic acid to form the corresponding sulphochlorides, and then with ammonia to convert these into the sulphonamides and then methylating same to the mono or dimethyl stage or ethylating to the mono ethyl stage; or by treating the said mixed sulphochlorides with amines such as methlyamine, ethylamine, etc.

In the specification of another U. S. Patent No. 1,353,385 filed 15th April, 1919, I have described the employment as high boiling plasticizing solvents for cellulose acetate, of high boiling mixtures containing ortho and para toluene low-carbon-alkyl sulphonamides, which mixtures are liquid at ordinary temperature and are such as can be obtained on treating commercial toluene by the ordinary methods of conversion into the alkyl sulphonamides, for example by treating the toluene with chlorosulphonic acid to form the corresponding sulphochlorides, treating the resulting raw mixture with ammonia to convert the sulphochlorides into sulphonamides, and then mythylating or ethylating to the monomethyl or monoethyl stage; or by treating the said raw mixture with amines such as methylamine, ethylamine, etc.

The present invention is characterized by the employment as plasticizing agents for the purpose mentioned, of high boiling mixtures of certain isomeric xylene low carbon dialkyl sulfonamides, being sulfonamides whereof at least one of the alkyl groups is ethyl, which mixtures are liquids at ordinary temperature and are further characterized by forming jellies at temperatures considerably below ordinary room temperatures, viz:—

(*a*) Mixtures of isomeric xylene diethyl sulfonamides. Such mixtures boil at about 148°–154° C. under 1 mm. pressure, are liquid at ordinary temperature, and form a soft clear jelly at —5° C. and a firm clear jelly at —20° C.

(*b*) Mixtures of isomeric xylene mythyl ethyl sulfonamides. Such mixtures boil at about 155°–156° C. under 1 mm., are liquid at ordinary temperature, form clear soft jellies at —14° C. and slightly harder jellies at —20° C.

It has been found that for some applications these aromatic dialkylated sulfonamide derivatives are not so good as the monoalkylated sulfonamide derivatives of my said U. S. Patents No. 1,353,384 and No. 1,353,385 or my U. S. Patent No. 1,501,206, granted July 15, 1924, on application S. No. 401,380 filed August 5, 1920, as their cellulose acetate solutions tend to become somewhat turbid when cooled down to or below ordinary temperature. Where this is not objectionable they may even be used alone, but they may be used together with the monoalkylated sulfonamide derivatives of my said specifications 1,353,384 and 1,353,385 or my Patent No. 1,501,206 of which the present is divisional, to obtain solutions which remain clear when cooled down, or together with any other suitable high boiling solvents of cellulose acetate.

For preparing the said mixtures of isomeric diethyl- or meythl-ethyl sulfonamides an ordinary commercial xylene was used in distilling between 135° and 146° C. (about 78% between 135° and 139° C.)

I do not, however, confine myself to working with these particular grades of hydrocarbon.

The procedure followed for preparing the alkyl sulfonamide products of the present invention may be according to the ordinary methods of preparing such alkylated compounds via the sulfochlorides, these either being treated with ammonia and then alkylated with the appropriate alkylating agents such as ethyl sulfuric acid salt or chlorethyl, or dimethyl sulfate, etc., or being treated direct with amines such as ethylamine, methylamine, etc.

It will be understood that in using the commercial impure xylene for making the mixtures of isomeric xylene diethyl- or methyl-ethyl sulfonamides as above mentioned, the treatment was carried out thereon without separation or purification of the intermediate or final products, though I do not confine myself in this respect, and it is to be understood that I do not limit myself to the particular procedure indicated for the preparation of the xylene alkyl sulfonamides of the present invention and that any other methods giving substantially similar products may be employed.

The high boiling plasticising solvents of the present invention may be employed in any suitable proportions, such for example as those indicated in my said specification No. 1,353,384.

Similarly to the alkylated sulfonamides specified in my said previous patents, the new solvents of the present invention may be employed with any usual or suitable solvents or liquids of low boiling point; likewise any other usual or suitable substances may be added, such as triphenyl phosphate, tricresylphosphate or similarly acting agents, or acid neutralizing aliphatic derivatives of urea which are liquid or have a low melting point, such as mono-, di- or tri-methyl urea or mono-, di- or tri-ethyl urea and so forth.

Also in making the solutions, compositions, or preparations with the solvents of the present invention any of the high boiling solvents of my U. S. Patents No. 1,501,206, dated July 15, 1924, or No. 1,508,928, dated Sept. 16, 1924, divisional thereof, may be added, or any other high boiling solvents or softening or plasticising substances may be added which are liquid substances, or even solid substances, provided they give liquid, gelatinous or non-solid mixtures with the solvents of the invention.

In order to illustrate by way of example how the invention may be carried out in practice, one may use to 100 kilos of a highly viscous cellulose acetate, about 25 kilos of any of the xylene alkyl sulfonamide derivatives of the present invention or of mixtures of them, or of any of them with akyl sulfonamide derivatives of my said previous specifications, and about 12 kilos of tricresylphosphate or triphenylphosphate, these substances being mixed together with solvents of low boiling point such as acetone, methyl acetate or ethyl acetate mixed with alcohol (four volumes to one volume of alcohol), the mass being worked in the ordinary way in celluloid apparatus, first in the mixers, then on the rollers and afterwards in the presses, and so on, as generally practised in the celluloid industry. This gives quite a hard incombustible celluloid-like product.

The quantity of about 25 kilos of the alkyl sulfonamide solvents may be reduced together with that of the triphenylphosphate or tricresylphosphate in order to get a still harder product if desired.

On the other hand, by increasing this quantity of the sulfonamide solvents one gets softer products in proportion as the quantity is increased until a product is obtained which is pliable like a fabric.

For example, if one takes to 100 kilos of cellulose acetate about 100 kilos of one of the high boiling plasticising solvents of the present invention (or of a mixture of them) then one gets the kind of product which is pliable like a fabric, and if the plasticising solvent is employed in quantities less than 100 per cent, reckoned on the weight of the cellulose acetate, a proportionately stiffer product is obtained according as the quantity of the plasticising solvent is reduced, whilst if the quantity of the plasticising solvent is increased above 100 per cent calculated on the weight of the cellulose acetate, a still more pliable product is obtained.

As stated in my British patent specification No. 114304, the higher the viscosity of the cellulose acetate the greater the quantity of the high boiling plasticising solvent which can be used, and the less the viscosity of the cellulose acetate the smaller the quantity of the high boiling plasticising solvent which can be used.

Colouring matters, filling materials and any other usual or suitable materials such as commonly employed in the art may of course be added in making solutions, compositions or other products according to the invention.

What I claim and desire to secure by Letters Patent is:—

1. A composition of matter containing cellulose acetate and a mixture of isomeric xylene low carbon dialkyl sulfonamides, being sulfonamides whereof at least one of the alkyl groups is ethyl which mixture is liquid at ordinary temperature and forms a jelly at low temperatures.

2. A composition of matter comprising cellulose acetate and a plasticising agent comprising a mixture of isomeric low carbon dialkyl sulfonamides, being sulfonamides whereof at least one of the alkyl groups is ethyl, which mixture is liquid at ordinary room temperature and is a jelly at temperatures somewhat below 0° C.

3. A composition of matter comprising cellulose acetate and a plasticising agent comprising a mixture of isomeric diethyl sulfonamides, which mixture is liquid at ordinary room temperature and is a jelly at temperatures somewhat below 0° C.

In testimony whereof I have hereunto subscribed my name.

HENRY DREYFUS.